United States Patent [19]

Wehrli et al.

[11] 4,290,694

[45] Sep. 22, 1981

[54] PHOTOGRAMMETRIC PLOTTING APPARATUS

[75] Inventors: Hans J. Wehrli, Valhalla; Timothy P. Roberts, Mohegan Lake, both of N.Y.

[73] Assignee: Kern Instruments, Inc., Brewster, N.Y.

[21] Appl. No.: 127,947

[22] Filed: Mar. 7, 1980

[51] Int. Cl.³ ............................................. G01C 11/12
[52] U.S. Cl. .......................................... 356/2; 358/96; 33/20 D
[58] Field of Search ......................... 356/2, 388-394; 33/20 D; 358/96

[56] References Cited

U.S. PATENT DOCUMENTS

| | | |
|---|---|---|
| 2,910,910 | 11/1959 | Rosenfeld et al. |
| 2,912,761 | 11/1959 | Woodward et al. ............. 33/20 |
| 2,933,008 | 4/1960 | Barnett . |
| 2,988,953 | 6/1961 | Barnett . |
| 3,004,464 | 10/1961 | Leighton et al. |
| 3,170,238 | 2/1965 | Yzerman ............................. 33/20 |
| 3,267,286 | 8/1966 | Bailey et al. |
| 3,355,807 | 12/1967 | Schoeler et al. |
| 3,465,444 | 9/1969 | Blachut et al. ................... 33/20 |
| 3,678,582 | 7/1972 | Helava et al. .................. 33/20 D |
| 3,989,933 | 11/1976 | Inghilleri ........................ 33/20 D |
| 4,005,932 | 2/1977 | Gates ................................. 356/2 |
| 4,057,336 | 11/1977 | Malinge ........................ 33/20 D |

FOREIGN PATENT DOCUMENTS

| | | |
|---|---|---|
| 372849 | 12/1963 | Switzerland . |
| 375913 | 4/1964 | Switzerland . |
| 433702 | 2/1968 | Switzerland . |
| 480650 | 12/1969 | Switzerland . |
| 527383 | 10/1972 | Switzerland . |
| 531704 | 1/1973 | Switzerland . |
| 302602 | 9/1971 | U.S.S.R. ............................ 356/2 |
| 678290 | 8/1979 | U.S.S.R. ............................ 356/2 |

OTHER PUBLICATIONS

"The Kern PG 3 System for First Order Stereo Restitution", Brochure, Kern Instruments, Inc., Brewster, N.Y.
A Few Words About the Kern-PG 2-SSL Stereo Plotter, Brochure, Kern Instruments, Inc., Brewster, N.Y.
Kern PG 2 Stereo Plotting Instrument, Brochure, Kern Instruments, Inc., Brewster, N.Y.
Bausch & Lomb, Zoom Transfer Scope, Brochure, Bausch & Lomb.
"Kern PG 2-AT Semi-Automatic Stereoplotter System", Brochure, Kern Instruments, Inc., Brewster, N.Y.

Primary Examiner—F. L. Evans

[57] ABSTRACT

A photogrammetric plotting apparatus is provided. The apparatus comprises an optical system means for viewing by an operator of an image of a first stereomodel derived from a pair of stereoscopically related photograms. The apparatus is further comprised of an operator controlled means for effecting stereomodel exploring motions relative to the photograms, and a tracing or display device. A means is provided for converting the exploring motions into plotting motions for the tracing or display device. A means is additionally provided for scanning image data of a second model to produce an image of the second model. Means is provided for conveying the image of the second model to the optical system. The optical system includes a means for superimposing the image of the second model on the image of the first stereomodel for simultaneous viewing by the operator. Preferably, scanned image data of the second model is on the tracing or display device and the means for conveying the image of the second model to the optical system is a television camera/monitor system. The apparatus finds particular application in the revision of maps, but has other related applications.

13 Claims, 5 Drawing Figures

PHOTOGRAMMETRIC PLOTTING APPARATUS

BACKGROUND OF THE INVENTION

1. Field of the Invention

This invention relates to a photogrammetric plotting apparatus for the stereoscopic plotting of photograms, and more particularly to a photogrammetric plotting apparatus which is particularly useful for the revisioning of maps.

2. Prior Art

Photogrammetry is the science or art of utilizing stereo perception to obtain reliable measurements of elevation and position of terrain from a pair of stereoscopically related photograms, e.g. aerial photographs. From these photograms typographic and planimetric maps are prepared by what is known as photogrammetric stereo plotting. Photogrammetric principles are also utilized in numerous fields to solve problems of mensuration requiring both absolute and relative determinations of size, shape, depth, height and location of objects in their environment; archeology, livestock evaluation, medical examinations, are but a few such fields of use. The utility of this invention is not to be considered limited only to map making usage, as described herein, but such use is only exemplary.

Generally, two aerial photographs, i.e. photograms, of the same terrain are taken at different points in the same vertical plane. The photograms are then compared to obtain points of equal elevation. A characteristic of true vertical stereophotograms is that all points at a given elevation on one photogram will "coincide" exactly with the same points on a second photogram. When these constant elevation points merge to form a random type curve, the curve is called a contour line. Thus, if the two stereoscopically related photograms are placed one above the other the contour lines for a given elevation could be made to lie exctly in coincidence by displacing in a horizontal plane one photogram relative to the other. For each elevation there is a corresponding displacement at which the lines at that elevation coincide. By following these lines with exploring motions relative to the photograms, whether manually or automatically, contour lines of equal evaluation can be traced.

Numerous complex systems have been devised to aid the operator in plotting such terrain and relief maps. These systems are generally known as photogrammetric plotting apparatus or stereo restitution instruments and are used for the production and revision of topographic maps. These systems require high accuracy and versatility.

Such photogrammetric plotting apparatus are well known in the art. See for example the following U.S. patents:

U.S. Pat. No. 2,910,910 to Rosenfeld et al;
U.S. Pat. No. 2,912,761 to Woodward et al;
U.S. Pat. No. 2,933,008 to Barnett I;
U.S. Pat. No. 4,988,953 to Barnett II;
U.S. Pat. No. 3,004,464 to Leighton et al;
U.S. Pat. No. 3,170,238 to Yzerman;
U.S. Pat. No. 3,267,286 to Bailey et al;
U.S. Pat. No. 3,355,807 to Schoeler et al;
U.S. Pat. No. 3,465,444 to Blachut et al;
U.S. Pat. No. 3,678,582 to Helava et al;
U.S. Pat. No. 3,989,933 to Inghilleri;
U.S. Pat. No. 4,005,932 to Gates; and
U.S. Pat. No. 3,057,336 to Malinge.

The entire disclosures of all these U.S. patents are incorporated herein by reference.

Known photogrammetric apparatus are the KERN PG 2, PG 2-AT, PG 3 and PG 2-SSL systems sold by Kern Instruments, Inc. Brewster, N.Y. The aforementioned Yzerman patent and Swiss Pat. Nos. 372,849, 375,913, 443,702, 480,650, 527,383 and 531,704 describe methods and apparatus used in these systems. The entire disclosure of all of these Swiss Patents are incorporated herein by reference.

Generally, such a prior art photogrammetric plotting apparatus comprises:
(a) an optical system means for the operator viewing an image of a stereo model derived from a pair of stereoscopically related photograms;
(b) an operator controlled means for effecting stereomodel exploring motions relative to the photograms;
(c) a tracing or display device;
(d) a means for converting the exploring motions into plotting motions for the tracing or display device.

Such an apparatus is exemplified in the aforementioned Rosenfeld et al, Woodward et al, Leighton et al, Blachut et al, Helava et al, Inghilleri, Gates and Malinge references and the KERN systems.

In the revisioning of maps, generally an existing map is displayed on the tracing or display device, typically an automatic tracing table, and recent aerial photographs or photograms of the same land area are placed in the photogrammetric plotting apparatus and viewed through the optical system means. The operator must constantly switch his viewing field from the existing map to the new photograms in the apparatus to determine what features are in the photograms which are not in the existing map and vis-a-versa. There is apparently no known photogrammetric plotting system or apparatus which permits the simultaneous viewing of the existing map and the new aerial photograms simultaneously.

Systems and apparatus have been used which utilize television cameras and monitors, for example:

The KERN PG 3 System uses a closed circuit television system for closeup vision around the pencil on the drawing table. The television camera is mounted on the drafting head of the plotter of the drawing table and the television monitor is on the side of the operator.

Rosenfeld et al utilizes a television scanning unit to scan a stereomodel produced by a pair of stereoscopic photograms. The information from the scanning unit is sent to an electronic computing mechanism which determines if the scanned spot is or is not on the surface of the stereomodel. If the spot is determined to be on the surface, the apparatus marks ines of successive dots on a sheet to correspond to these spots.

Woodward et al utilizes two photoelectric scanners to scan images produced by the projection of copies of the original photographs. The photoelectric scanners convert the optical patterns into electrical signals which after amplification and certain comparisons may then be used to provide marks on the mapping surface.

Barnett I and Barnett II—photographs or negatives taken through aerial photography are presented to two television cameras. The camera signals are controlled and viewed on their separate control monitors and then mixed together in the master monitor. The images on the master monitor may then be photographed with a camera. Optionally the signals from the signal switching amplifier may be stored in a magnetic memory unit for subsequent use, such as transferring it to the television monitor.

Leighton et al uses a photoelectric scanning process which includes a vidicon camera for scanning a stereomodel over a plane surface produced by a set of stereo dispositives.

Gates—a television camera projects an image of a flexible platen onto a screen. Information from the screen is then traced on an overlay.

Malinge provides a screen which has images of the photograms projected thereon, and is observed by the operator when he looks through the analyzer. Malinge is significant in that it requires the observer to be approximately the same distance from the screen as from the useful region of the tracing or display device so that the observer can easily and without fatigue watch the screen and then watch the plotting device without having to refocus his eyes to any substantial extent.

Additionally, the ZOOM TRANSFER SCOPE of Bausch and Lomb, enables the operator to view two separate images simultaneously. This system however does not relate to stereo photogrammetric plotting and does not produce an overlay with a television camera or monitor.

OBJECTS AND SUMMARY OF INVENTION

It is an object of this invention to provide a photogrammetric plotting apparatus which is particularly useful in the revisioning of maps.

It is a further object of this invention to provide a photogrammetric plotting apparatus which has the capability of superimposing the image of, for example, an existing map which is displayed on a tracing or display device, on an image produced by recent photograms of the same land area, for simultaneous viewing by the operator through the optical system means of the apparatus.

It is a further object of this invention to provide a photogrammetric plotting apparatus which can utilize image data of a model to superimpose the image of that model on a stereomodel under observation by the apparatus for simultaneous viewing by the operator.

The foregoing objects of this invention are accomplished by a photogrammetric plotting apparatus comprising:
(a) an optical system means for operator viewing of an image of a first stereomodel derived from a pair of stereoscopically related photograms;
(b) operator controlled means for effecting stereomodel exploring motions relative to the photograms;
(c) a tracing or display device;
(d) means for converting the exploring motions into plotting motions for the tracing or display device;
(e) means for scanning image data of a second model to produce an image of the second model;
(d) means for conveying the image of the second model to the optical system;
wherein the optical system includes a means for superimposing the image of the second model on the image of the first stereomodel for simultaneous viewing by the operator.

The foregoing objects, together with other features and advantages of this invention, will become more apparent when the specification including preferred embodiments of this invention, are considered in connection with the accompanying drawings and claims.

DETAILED DESCRIPTION OF THE INVENTION

Figure 1:
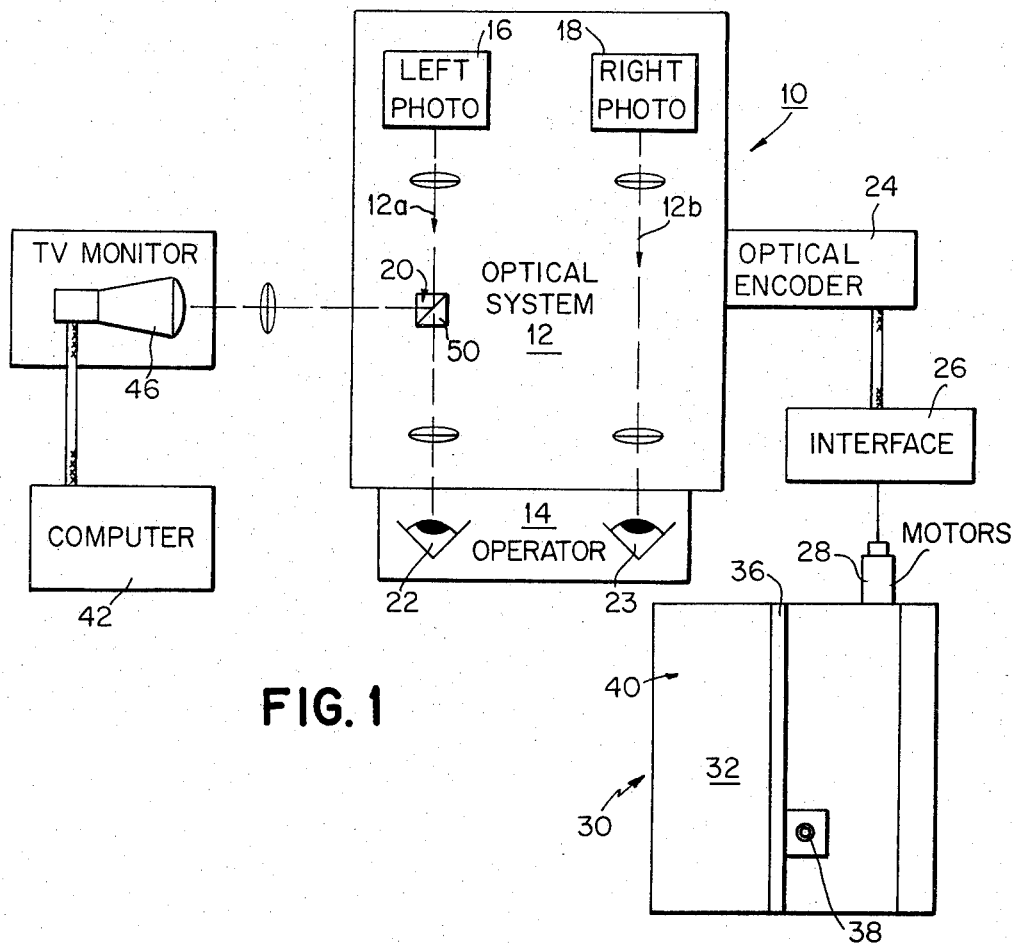
FIG. 1 is a schematic drawing of the embodiment of the apparatus of this invention wherein the tracing or display device is an automatic tracing table and the image data for the second model is provided by computer stored digital information.
Figure 2:
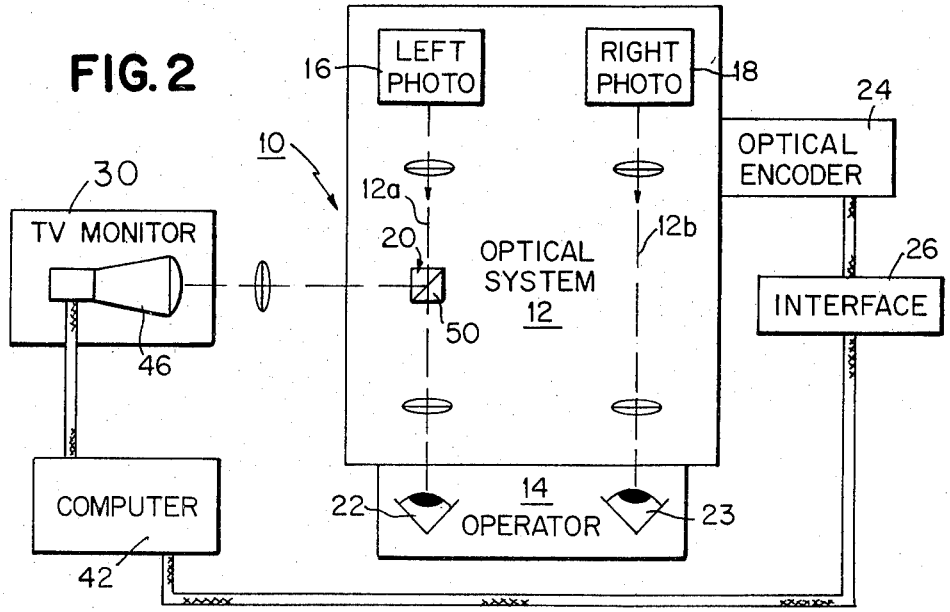
FIG. 2 is a schematic drawing of another embodiment of the apparatus of this invention wherein the tracing or display device is a television monitor and the image data for the second model is provided by computer stored digital information.
Figure 3:
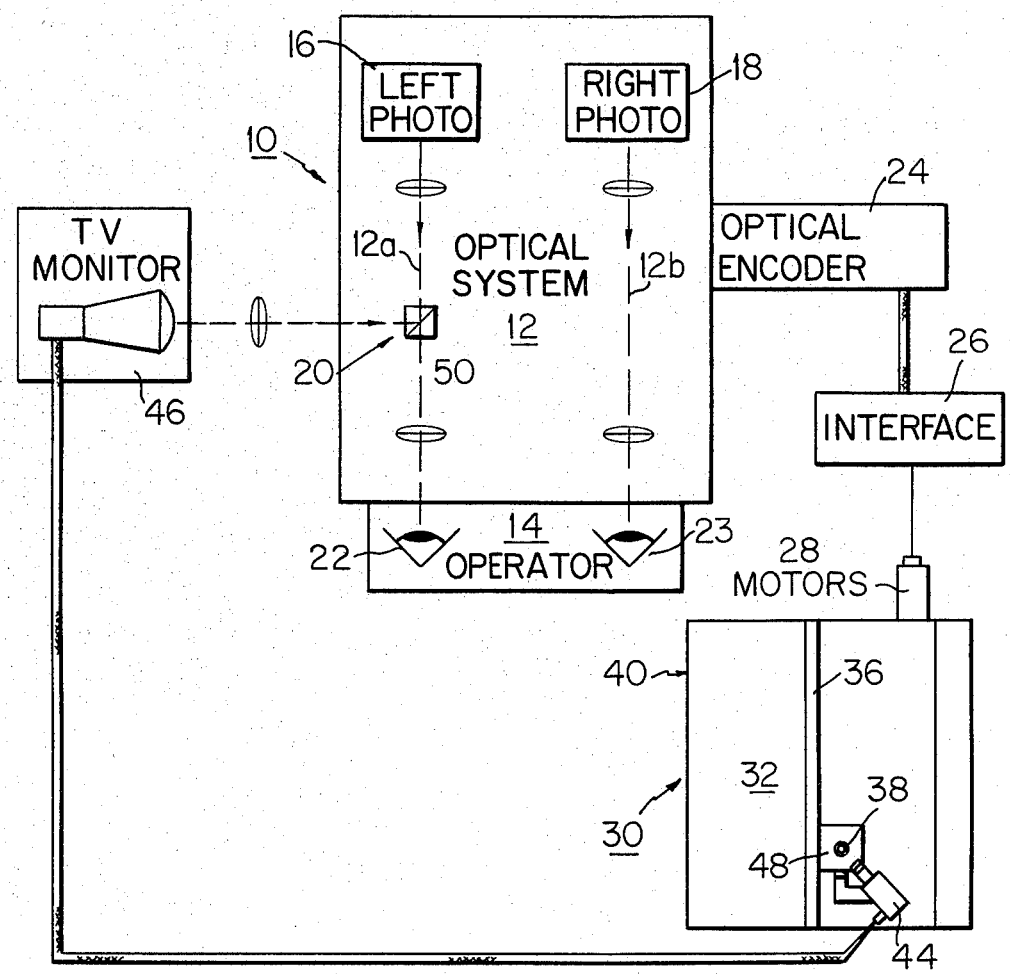
FIG. 3 is a schematic of a preferred embodiment of the apparatus of this invention wherein the tracing or display device is an automatic tracing table and a television camera and television monitor are utilized to scan the image displayed on the tracing table and convey it to the optical system.

Referring to FIGS. 1 to 3, the photogrammetric plotting apparatus, generally designated (10), is comprised of an optical system means, generally designated (12) for viewing by an operator (14) of an image of a first stereomodel derived from a pair of stereoscopically related photograms (16 & 18). Such optical system means (12) is well known in the art and used in many known photogrammetric plotting apparatus. A particularly preferred known optical system means is that used in the KERN PG 2 Stereo Plotting Instrument as shown in the "KERN PG 2 Stereo Plotting Instruments" brochure, Kern Instruments Inc. Brewster, N.Y. (203e7.77), the entire brochure being incorporated herein by reference. The preferred optical system means (12) of this invention is that shown in FIG. 4 which includes the means for superimposing the image of the second model on the image of the first stereomodel, generally designated (20), for simultaneous viewing by the operator (14). This is discussed more in detail below.

Generally, however, the optical system means (12) is a binocular system with for example, the left eye (22) of the operator (14) viewing the left photogram (16) and the right eye (23) of the operator (14) viewing the right photogram (18). When the operator (14) looks through the binocular system of the optical system means (12) he spontaneously and stereoscopically views the photograms. Typically the optical system means (12) includes a zooming means for magnifying the photograms (16 & 18). Typically, for example, magnifications of 2, 4 or 8 times may be used. Such optical system means (12) are well known in the art and disclosed in many of the aforementioned references, as well as others.

Still referring to FIGS. 1 to 3, the optical system means (12) provides the operator (14) with a view of an image of a stereomodel having the contours to be analyzed. Plotting or tracing the countour of the stereomodel is effected by an operator controlled means (not shown) which effects stereomodel exploring motions relative to the photograms (16 & 18). Such operator controlled means are also well known in the art and disclosed in many of the aforementioned references, as well as others.

Generally, the means for converting the exploring motions into plotting motions for the tracing or display device may be accomplished either mechanically or electronically by attaching certain devices to the mechanical elements of the means for effecting the stereomodel exploring motions. These mechanical and/or electronic devices record or transmit positional information regarding the exploring motions. From this positional information two or three dimensional representations of the terrain or other objects can be drawn and recorded by the tracing or display device. Preferably, optical rotary encoders are used to convey the exploring motions into plotting motions for the tracing or display device. Optionally mechanical means may be used. e.g. a pantograph, to convey the exploring motions into plotting motions for the tracing or display device.

As shown in FIG. 1 to 3, the exploring motions may, for example, be transmitted to an encoder means e.g. an optical encoder (24). Output signals from the encoder means (24) are then evaluated and recorded. An interface means (26) transduces the exploring motions received from the encoder means (24) into signals which are fed into a motor means (28) attached to the tracing or display device, generally designated (30), thus converting the exploring motions into plotting motions for the tracing or display device (30).

As depicted in FIGS. 1 and 3, the tracing or display device (30) may be an automatic tracing table (32), whereas in FIG. 2 the tracing or display device (30) is television monitor (46). The encoder means (24), interface means (26), motor means (28) for the automatic tracing table (32), and the automatic tracing table (32) are all well known elements in the art.

Advantageously, the tracing or display device (30) is disposed to the side of the operator (14) and, as indicated previously may be an automatic tracing table (32). The tracing table may have an arm (36) and a tracing pen or scriber (38).

The apparatus of this invention preferably uses an automatic tracing table (32) which is an electronic X-Y plotting coordinatograph which includes an interface means (26) for plotting with pen, pencil or stylus, maps with the positional information supplied by the optical rotary encoder means (24). The interface means (26) also allows additional operator commands to influence the pen motion, such as scale factors, lines and pen up and pen down motions. Preferably the drafting head consists of two pen holders and is driven about the drafting surface by special motors.

The interface means (26) may be a computer means. The computer means can be used to drive the coordinatograph, e.g. automatic tracing table (32). The coordinatograph, which is conventional, has a surface (40) on which a sheet of paper, map or the like may be positioned to receive a mark from a pen or pencil type scriber (38). Generally, the scriber (38) is carried on and moved in the Y-axis direction by a Y-axis screw, which is supported on a Y-axis carriage and is revolved on a Y-axis servomotor. The Y-axis carriage is supported on an X-axis carriage which includes an X-axis screw. The X-axis screw is revolved by an X-axis servomotor so that the Y-axis carriage is moved in the X-direction and accordingly the scriber (38) along the surface of the table. Consequently, while the operator (14) of the photogrammetric apparatus (10) is effecting stereomodel exploring motions relative to the photograms, (16 & 18), command signals are developed by the circuits and processed by the computer so as to cause the X-and Y-axis servomotor to manuever the scriber (38) and form the same contour as that made or explored by the operator (14). The computer can be programmed so the contour plotted by the coordinatograph's scriber (38) has either a greater or a lesser scale than that plotted by the operator, effecting the stereomodel exploring motions.

The photogrammetric plotting apparatus (10) further comprises a means for scanning image data of a second model. Broadly, the image data can be any form capable of being transformed from the image data into an image of the second model. For example, referring to FIGS. 1 and 2, the image data is in the form of computer stored digital information. The computer (42) scans this image data and transforms it into a signal. In FIG. 3, the image data is in the form of an image which is on the tracing or display device (30), in particular the automatic tracing table (32). Thus at least part of the image data for the second model is obtained by scanning the image on the automatic tracing table (32). Part of the image from the automatic tracing table (32) may be supplemented with digital information, such as alpha numeric data and computer graphic display. As indicated in FIG. 2, the tracing or display device can be the television monitor (46).

In FIGS. 1 and 2, the computer (42) is the means for scanning the image data; whereas in FIG. 3 a television camera (44) scans the image data, i.e. the image on the automatic tracing table (32).

The apparatus (10) is further comprised of a means for conveying the image of the second model to the optical system means (12). FIG. 1 shows a television monitor which is used to convey the image produced by the signals from the computer (42) to the optical system means (12). The optical system means (12) is adapted to receive the image from the monitor (46). The television monitor (46) is in optical communication with the means for superimposing the image of the second model on the image of the first stereomodel (20) for simultaneous viewing by the operator.

FIG. 2 has the same type means for scanning the image data, i.e. computer (42), and means for conveying the image to the optical system means (12), i.e. television monitor (46), as shown in FIG. 1.

FIG. 3 shows a television camera (44) scanning the image on the automatic tracing table (32). The image is conveyed by electrical impulses to a television monitor (46) which is adapted to receive the image from the camera (44). The television monitor (46) is also in optical communication with the means for superimposing (20).

Referring to FIG. 3, preferably, the television camera (44) is mounted on the drafting head (48) near the scriber (38) of the automatic tracing table (32) and could be focused on the map being drawn or on the existing map being revised. A zooming means may be included in the optical system means (12), the television camera (44) and/or the television monitor (46). This would permit the operator (14) to vary the size of the image on the television monitor (46) and to match the scale of the image of the photograms (16 & 18), seen through the optical system means (12).

It should be indicated herein that any type means for scanning the image data and means for conveying the image of the second model may be utilized. For example, fiberoptics, a well known technique in the art, may be used to convey an image from, for example, the automatic tracing table to the optical system means.

Referring more particularly to FIG. 4, and FIGS. 1 to 3 also, the preferred means for superimposing the image received from the television monitor (46), as for example, in FIGS. 1 to 3, is a beam combiner means (50 for combining the image from the television monitor (46) with the image of the first stereomodel from the photograms (16 & 18).

Figure 4:
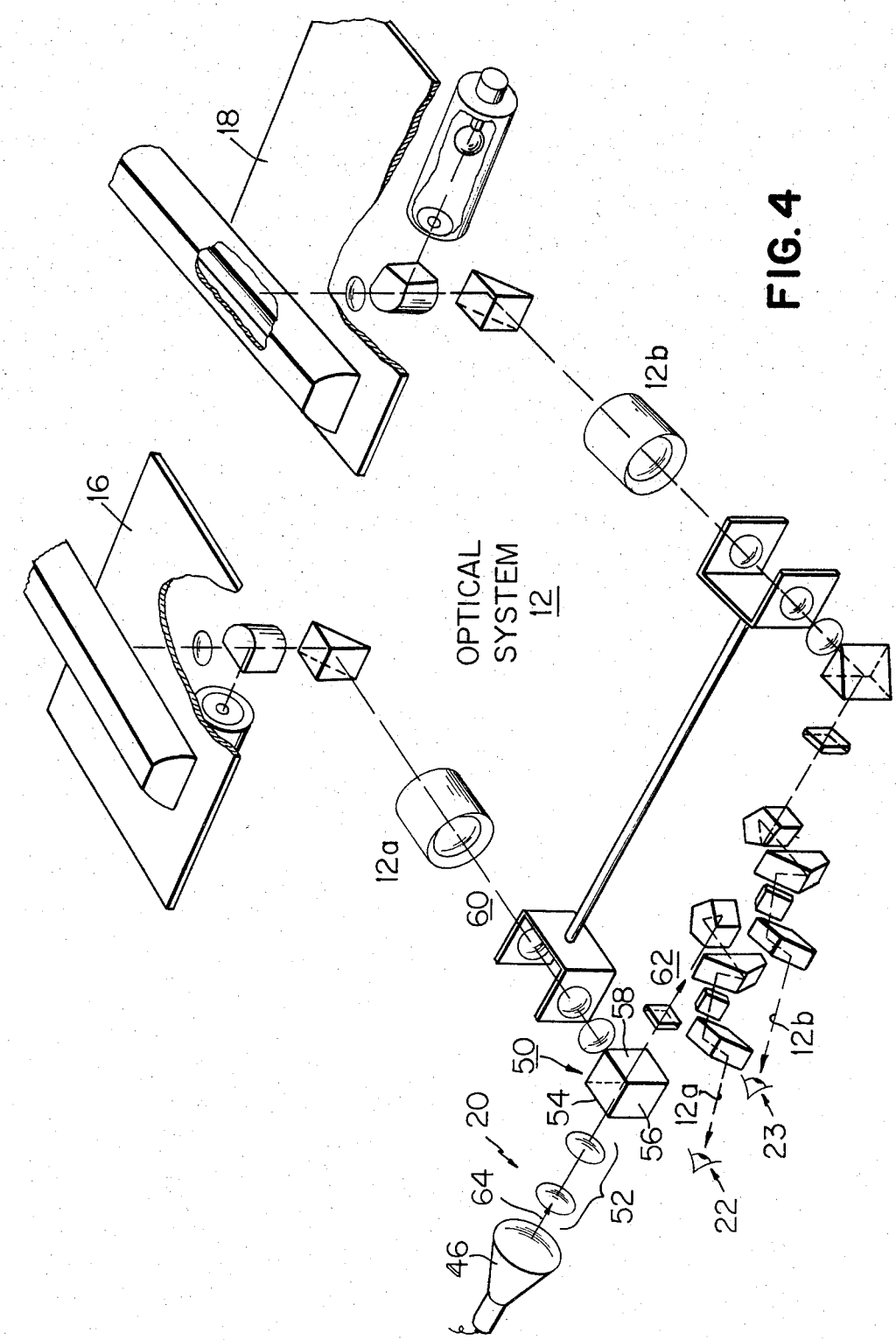
FIG. 4 is an embodiment of an optical system of the preferred apparatus of this invention which includes as a means for superimposing the image of the second model on the image of the first stereomodel for simultaneous viewing by the operator, a beam combiner means which combines the image from the television monitor with the image of the first stereomodel.

Referring to FIG. 4, the optical system means, generally (12), has two optical systems (12a & 12b) which bring the corresponding regions of the two photograms (16 & 18) into the line of sight of the two optical systems (12a & 12b). The lines of sight are represented by the chain-dotted lines in FIG. 4.

FIG. 4 does not show the means for moving the photograms with respect to the optical system (12) or support structure for the optical systems (12a & 12b). The moving means are conventional and may, for example comprise a table making movements to move each photogram (16 & 18) in two directions at right angles.

The optical systems (12a and 12b) are disposed so as to project images of reference marks (not shown) and of corresponding regions of the photograms (16 & 18) to the eyes (22 & 23) of the operator (14).

The apparatus (10) of this invention is such that an operator (14), whose eyes (22 & 23) are shown in FIG. 4, and who looks through the optical systems (12a & 12b) can see the image of the second model superimposed on the image of the first stereomodel simultaneously. This is accomplished by projecting the center of the image produced by the television monitor (46) through a lens system (52) which projects onto a beam combiner (54) using methods and elements well known in the art.

Figure 5:
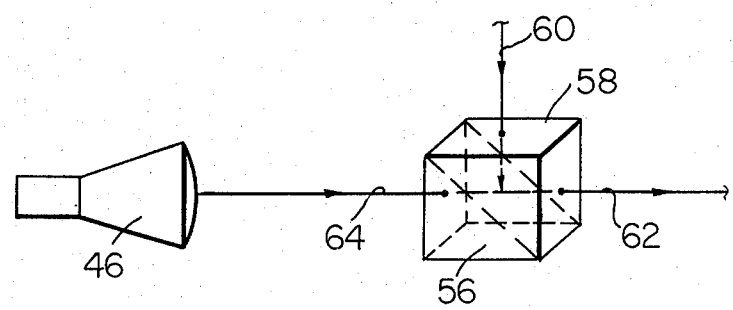
FIG. 5 is a schematic of the preferred beam combiner means used in FIG. 4.

In the particular embodiment shown in FIG. 4 and as schematically shown in FIG. 5, two right angle prisms (56 & 58) are juxaposed against each other whereby one image (60) representing the image from the photogram is deflected by one right angle prism (58) in direction (62) and the other image (64) from the television monitor passes through both prisms (56 & 58) as if through clear glass. Thus the two image paths originally at right angles to each other are combined into a single coincident path (62).

FIG. 4 depicts the image of the second model, i.e. from the television monitor (46), being conveyed to the left eye (22) however it may just as conveniently be conveyed to the right eye (23).

Prior to this invention the map revisioning process was much slower than the production of original maps because of the frequent checking between the recent aerial photograms and the existing map, which must be done in order to separate the new features (roads, houses, etc.) from existing ones. The present invention permits the simultaneous viewing of the existing map and recent aerial photograms with high precision and near perfect correspondence and provides for the rapid recognition and accurate updating of existing maps. Newly added features are immediately visable and confusion is avoided as to whether the revised map is complete.

While certain specific structure embodying the invention are shown and described herein, it is manifest to those skilled in the art that various modifications can be made to this invention without departing from the spirit and scope of the inventive concept, and that the invention is not to be limited to the particular embodiments shown and described herein, except in so far as indicated by the scope of the appended claims.

What is claimed:

1. A photogrammetric plotting apparatus comprising:
   (a) an optical system means for operator viewing of an image of a first stereomodel derived from a pair of stereoscopically related photograms.
   (b) operator controlled means for effecting stereomodel exploring motions relative to the photograms;
   (c) a tracing or display device;
   (d) means for converting the exploring motions into plotting motions for the tracing or display device;
   (e) means for scanning image data of a second model to produce an image of the second model;
   (f) means for conveying the image of the second model to the optical system means;
   wherein the optical system means includes a means for superimposing the image of the second model on the image of the first stereomodel for simultaneous viewing by the operator.

2. The apparatus of claim 1, wherein at least part of the image data of the second model is obtained by scanning an image on the tracing or display device.

3. The apparatus of claims 1 or 2, wherein the tracing or display device is a television monitor.

4. The apparatus of claim 1, wherein the tracing or display device is an automatic tracing table.

5. The apparatus of claim 2, wherein the tracing or display device is an automatic tracing table.

6. The apparatus of claim 5, wherein the means for scanning the image data is a television camera and the means for conveying the image to the optical system means is a television monitor adapted to receive the image from the camera, the television monitor being in optical communication with the means for superimposing.

7. The apparatus of claim 4 or 5, wherein the means for conveying the image to the optical system means is a fiber optic means.

8. The apparatus of claim 1, wherein the optical system means includes a zooming means.

9. The apparatus of claim 6, wherein the television camera includes a zooming means.

10. The apparatus of claim 6, wherein the television monitor includes a zooming means.

11. The apparatus of claim 2, wherein the tracing or display device is a pantograph.

12. The apparatus of claim 1, wherein the image data is computer stored digital information.

13. The apparatus of claim 6, wherein the means for superimposing is a beam combiner means for combining the image from the television monitor with the image of the first stereomodel.

* * * * *